United States Patent
Grillo

(10) Patent No.: US 6,811,012 B2
(45) Date of Patent: Nov. 2, 2004

(54) CLUTCH RELEASE BEARING WITH ROLLERIZED FORK CONTACTS

(75) Inventor: John M. Grillo, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/040,879

(22) Filed: Jan. 7, 2002

(65) Prior Publication Data

US 2003/0127298 A1 Jul. 10, 2003

(51) Int. Cl.[7] .................. F16D 23/14; F16D 13/74
(52) U.S. Cl. .................. 192/98; 192/995; 192/110 B; 192/113.5
(58) Field of Search .................. 192/98, 99 S, 192/91 R, 113.5, 110 B; 184/5.1; 384/473, 606

(56) References Cited

U.S. PATENT DOCUMENTS

| | | | | |
|---|---|---|---|---|
| 2,278,663 A | * | 4/1942 | Loeffler et al. | 192/113.5 |
| 4,014,420 A | * | 3/1977 | Riese | 192/13 R |
| 4,895,235 A | * | 1/1990 | Nishimura et al. | 192/98 |
| 5,647,810 A | | 7/1997 | Huddleston | |
| 5,911,296 A | | 6/1999 | Cole et al. | |
| 5,927,454 A | * | 7/1999 | Campbell et al. | 192/98 |
| 5,947,251 A | * | 9/1999 | Goins | 192/110 B |
| 6,029,790 A | * | 2/2000 | Liu et al. | 192/98 |
| 6,102,181 A | | 8/2000 | Lepard et al. | |
| 6,148,983 A | * | 11/2000 | Borjesson | 192/99 S |
| 6,311,818 B1 | * | 11/2001 | Cole et al. | 192/99 S |
| 6,446,778 B1 | * | 9/2002 | Cole et al. | 192/98 |

FOREIGN PATENT DOCUMENTS

| | | | |
|---|---|---|---|
| GB | 1495775 | * | 12/1977 |
| JP | 62-242132 A | * | 10/1987 |

* cited by examiner

*Primary Examiner*—Rodney H. Bonck
(74) *Attorney, Agent, or Firm*—Cohen, Pontani, Lieberman & Pavane

(57) ABSTRACT

A clutch assembly for a mobile vehicle clutch includes a sleeve axially disposed on a shaft and engaged to actuate clutch springs or levers for opening of a clutch. The sleeve is attached to a clutch release bearing that is moved axially along the input shaft by a clutch fork. Engagement pads of the release fork engage rollers disposed on the clutch release bearing. The rollers on the clutch release bearing substantially eliminate transmission of non-axial force to the clutch release bearing and sleeve. The clutch release bearing includes an internal cavity in communication with a lubrication fitting. The rollers include hollow shafts in communication with the internal cavity of the clutch release bearing such that the lubricant injected into the internal cavity lubricates the rollers.

13 Claims, 5 Drawing Sheets

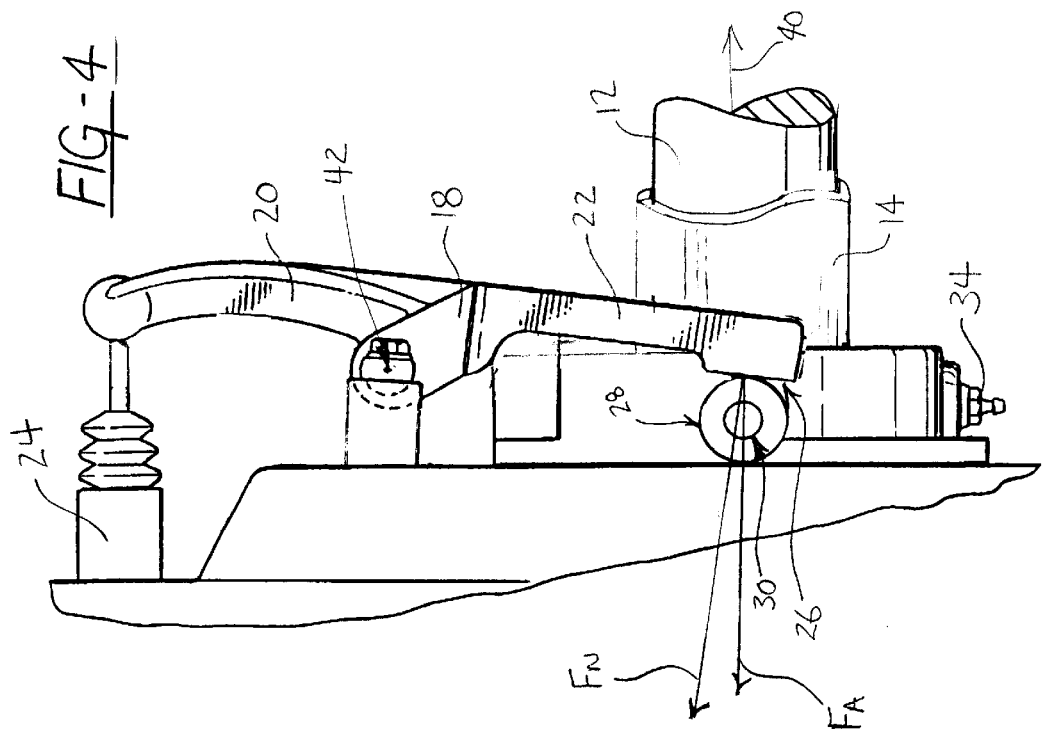
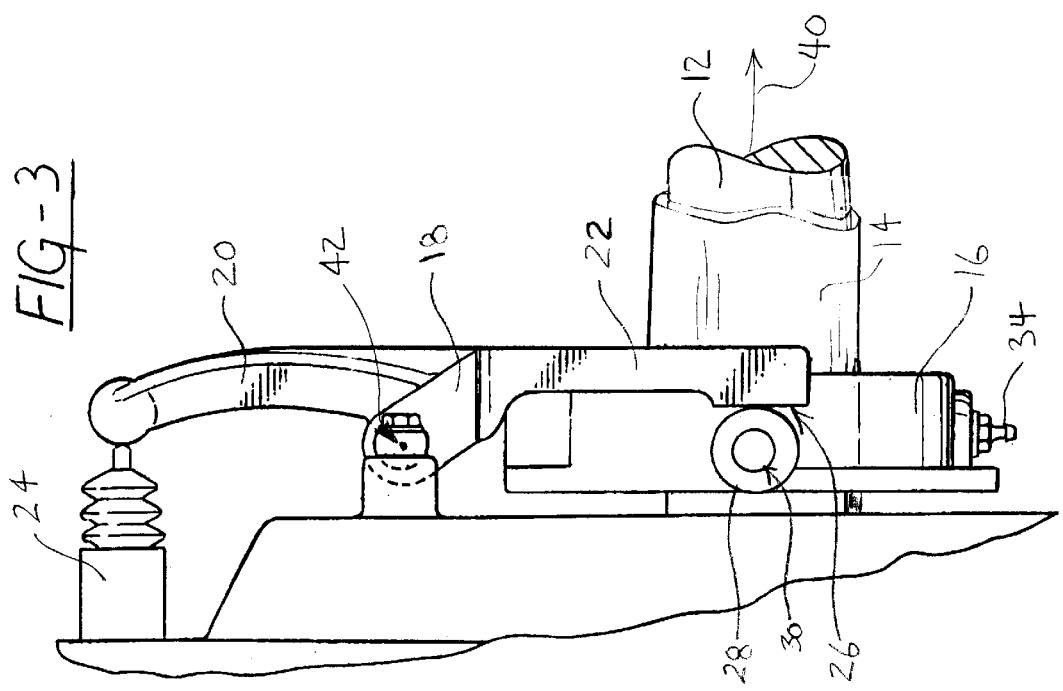

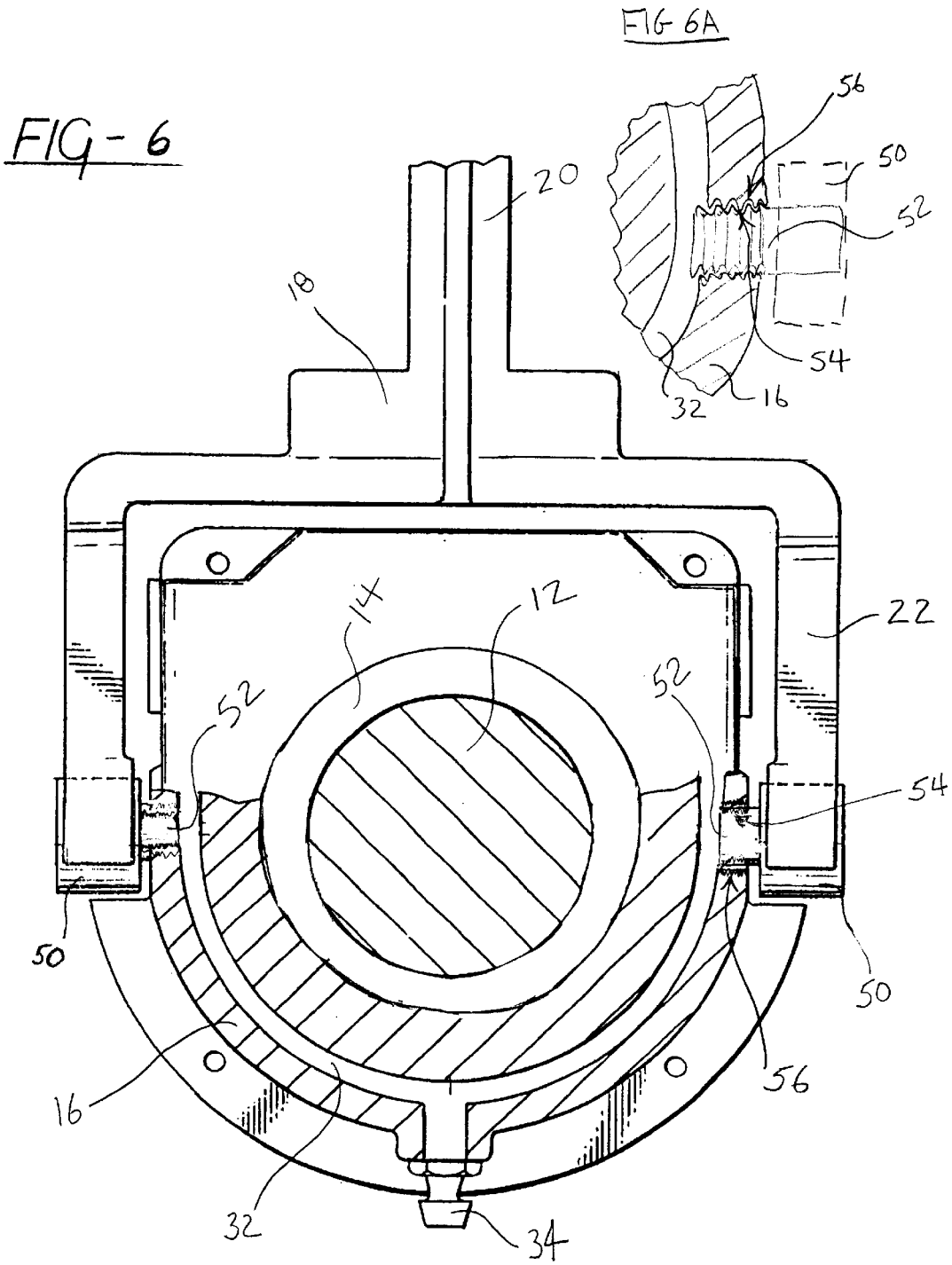

CLUTCH RELEASE BEARING WITH ROLLERIZED FORK CONTACTS

BACKGROUND OF THE INVENTION

This invention relates generally to a clutch release assembly for selectively coupling a clutch between an engine and a transmission of a motor vehicle.

Clutches for motor vehicles typically include a sleeve connected to a release bearing actuated by a clutch lever or fork. The sleeve engages clutch springs or levers that bias a clutch plate into engagement with a flywheel driven by the engine. The sleeve slides axially along and rotates with an input shaft of the transmission. A clutch release bearing is disposed on the input shaft to engage the sleeve and transmit axial movement from the clutch fork. Typically, the clutch release bearing includes an inner race that rotates with the input shaft and the sleeve, and an outer housing or race that remains stationary relative to the inner race. Typically, the outer housing includes wear pads that are in contact with the clutch fork. The clutch fork is pivotally mounted to a housing and pivoted by an actuator in response to an operator depressing a clutch pedal. The clutch fork pivots to move the clutch release bearing axially along the shaft and thereby open the clutch.

The pivotal motion of the clutch fork in combination with frictional force between the fork arms and wear pads creates an uplift force on the clutch release bearing and sleeve. The uplift force is approximately equal to the coefficient of friction between the fork arms and the pads multiplied by the normal force applied to the arms against the pads. The uplift force presses the sleeve against the input shaft during clutch disengagements to accelerate wear of the shaft and clutch release bearing.

It is becoming increasingly necessary for original equipment manufacturers to construct clutch assemblies that are substantially maintenance free. For that reason it is known to employ rollers on the clutch fork to reduce friction and uplift forces on the clutch release bearing and sleeves. The use of rollers on the fork that actuates the release bearing substantially reduces the friction and thereby the uplift force on the release bearing. However, rollers disposed on the actuation fork must be maintained separately from the clutch release bearing. Typically, the clutch release bearing includes an internal cavity filled with lubricant by way of a grease fitting. The clutch fork has no such configuration; therefore, the rollers on the fork must be lubricated in a separate operation from the clutch release bearing. Typical configurations and locations of the clutch fork increase the difficulty and time required for proper lubrication or replacement of clutch fork mounted rollers.

For this reason it would be desirable to design a clutch release bearing and fork actuation assembly that could further increase the life of the bearing sleeve, eliminate friction that induces uplift and accelerates wear, while providing for routine maintenance and ease of lubrication of the rollers.

SUMMARY OF THE INVENTION

An embodiment of this invention is a clutch assembly including rollers mounted on the clutch release bearing in contact with a release fork to substantially reduce wear caused by frictional forces during clutch actuation.

The clutch assembly includes a clutch release bearing moveable along a transmission input shaft and attached to a sleeve. The sleeve moves axially along the input shaft to engage clutch springs or levers that operate to disengage the clutch. The clutch release bearing includes rollers in contact with a clutch release fork. The clutch release fork pivots about an axis in response to movement of an actuator. Pivotal movement of the clutch release fork transmits a force on the clutch release bearing that is normal to the face of contact pads of the clutch release fork. The normal force transmitted to the clutch release bearing includes a non-axial component that can cause premature wear of the clutch release bearing and sleeve. The clutch release bearing of this invention includes rollers disposed at the contact point between the release fork and the clutch release bearing. The rollers eliminates the transmission of non-axial force to the clutch release bearing and to the sleeve, thereby substantially extending the life of the sleeve and clutch release bearing.

In one embodiment of the invention, the rollers rotate about a threaded shaft threadably connected to the clutch release bearing to allow easy change out.

In another embodiment of the invention, the clutch release bearing includes an internal cavity filled with lubricant. Lubricant fills the internal cavity by way of a single grease fitting. Each of the rollers includes a threaded hollow shaft mounted to the clutch release bearing and in communication with the internal cavity. This configuration facilitates lubrication of the rollers through the grease fitting for the internal cavity. Lubricant from the internal cavity flows through the hollow shaft to lubricate the rollers such that the rollers are lubricated during routine maintenance along with the clutch release bearing.

The clutch assembly of this invention includes rollers in contact with a release fork to eliminate axial force on the clutch release bearing and sleeve such that the life of the sleeve and clutch release bearing are substantially extended. Further, the clutch assembly of this invention includes an internal cavity that provides for the common lubrication of the rollers during routine lubrication of the clutch release bearing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a side view of the clutch release assembly in a non-actuated position;

FIG. 4 is a side view of the clutch release assembly in an actuated position;

FIG. 6 is a cross-sectional view of another embodiment of the clutch release assembly with solid shafts supporting the rollers; and FIG. 6A is an enlarged cross-sectional view of the solid shaft attached to the clutch release bearing.

DETAILED DESCRIPTION OF THE PREFERRED EMBODIMENT

Figure 1:
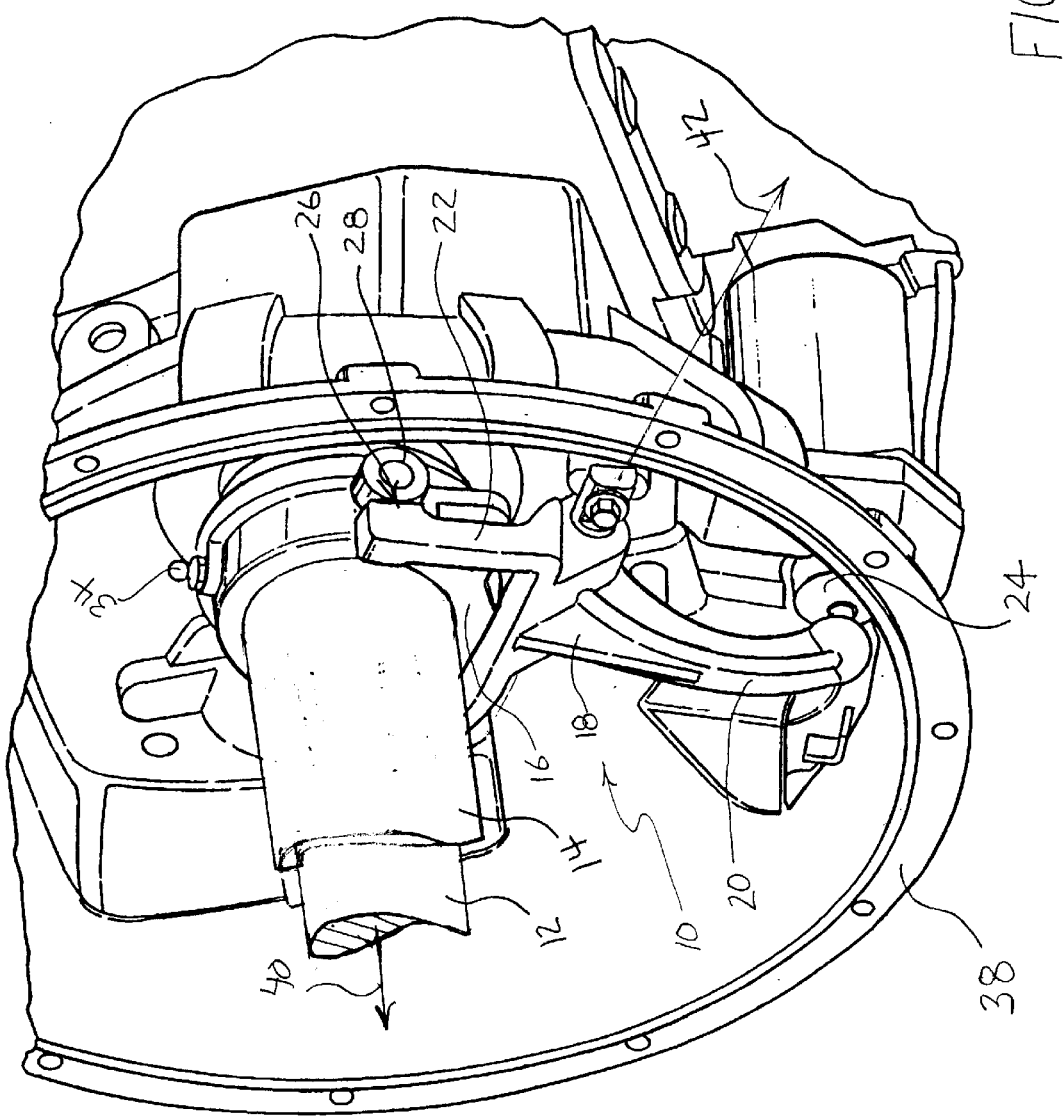
FIG. 1 is a perspective view of a clutch release assembly and fork.

An embodiment of a clutch assembly is generally shown at 10 in FIG. 1. The clutch assembly 10 includes a clutch release bearing 16 attached to a sleeve 14 axially movable along a shaft 12. The sleeve 14 rotates with the input shaft 12 and moves axially along the shaft 12 about the axis 40. The clutch release bearing 16 includes rollers 28 in contact with a clutch release fork 18 pivotally supported by housing 38.

Figure 2:
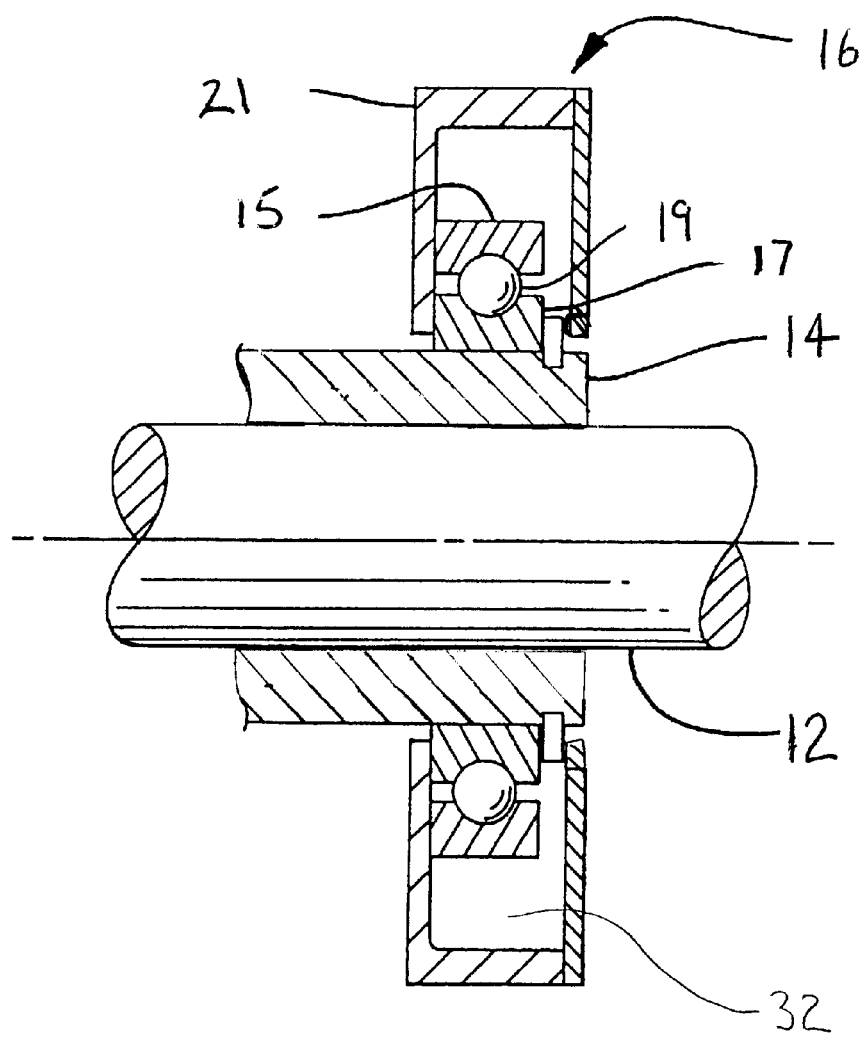
FIG. 2 is a cross sectional view of the interface between the sleeve and clutch release bearing.

Referring to FIGS. 1 and 2, the clutch release bearing 16 includes an inner race 17 attached to the sleeve 14 that rotates with the sleeve 14 and input shaft 12 and an outer race 15 that remains stationary relative to the inner race 17. A bearing 19, disposed between inner and outer races 17, 15, transmits axial movement of the clutch release bearing 16 to the sleeve 14. The inner and outer races 17,15 are disposed within a clutch release bearing housing 21.

The release fork 18 pivots about a pivot axis 42 by way of a pivotal connection 41. The release fork 18 includes two engagement arms 22 and an actuation arm 20. An actuator 24 mounted within the housing 38 engages the actuation arm 20 to pivot the release fork 18 about the axis 42. Pivotal motion of the release fork 18 causes axial movement of the clutch release bearing 16 along the shaft 12.

Figure 5:
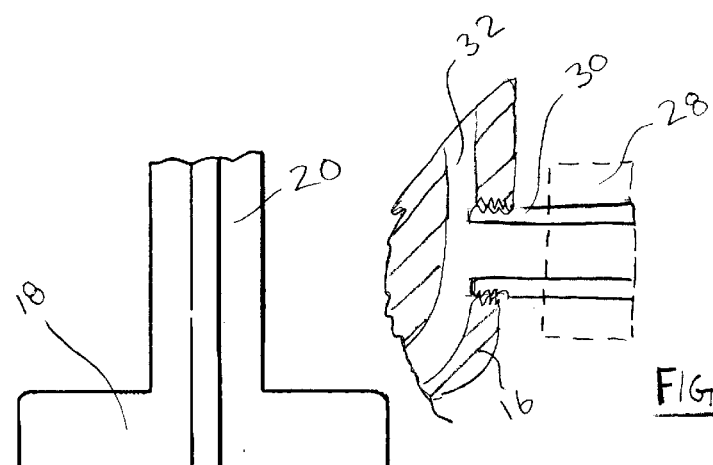
FIG. 5 is a cross-sectional view showing the internal cavity of the clutch release assembly along with the roller assemblies.
Figure 5A:
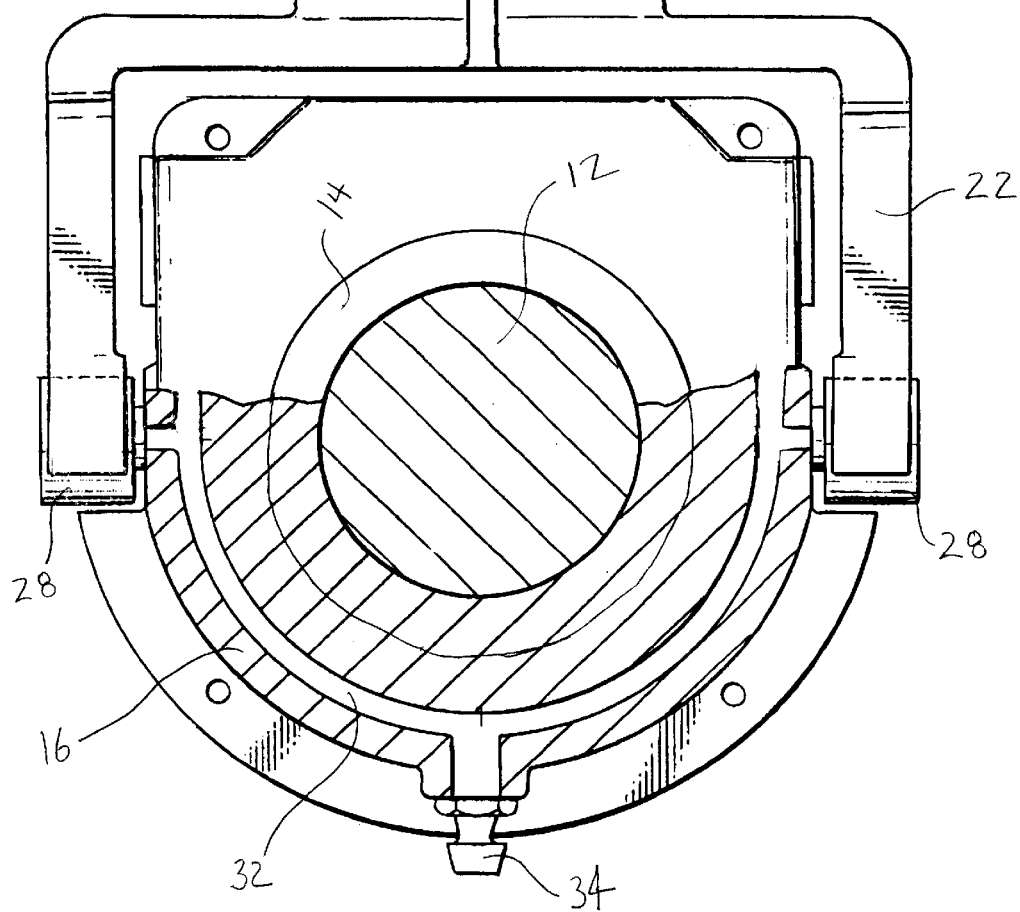
FIG. 5A is an enlarged cross-sectional view of the roller hollow shaft and internal cavity of the clutch release bearing.

Referring to FIGS. 3 and 4, each engagement arm 22 includes a pad 26 in contact with the rollers 28. FIG. 3, shows the release fork 18 in a non-actuated position and FIG. 4 shows the release fork 18 pivoted about the axis 42 to an actuated position. The pivoted release fork 18 exerts a force normal to the pad 26 of each engagement arm 22 as indicated by arrow FN. However, only the axial component indicated by arrow FA is transmitted to the clutch release bearing 16 because the rollers 28 substantially eliminate frictional contact that would otherwise urge the release bearing 16 upward as indicated by arrow FN. In other words, the pads 26 do not transmit frictional non-axial forces that cause upward or non-axial force on the clutch release bearing 16. The elimination of non-axial movement of the clutch release bearing 16 because of the contact between the pads 26 of the release fork 18 and the rollers 28 substantially reduces wear on the clutch release bearing 16 and sleeve 14. It should be understood that it is within the contemplation of this invention to utilize a clutch release fork 18 and a clutch release bearing 16 of any configuration known to one skilled in the art Referring now to FIGS. 5 and 5A, the clutch release assembly 10 is shown in cross-section to illustrate the internal cavity 32 of the clutch release bearing 16. During routine maintenance, lubricant, such as grease, is injected into the internal cavity 32 through a grease fitting 34. Preferably, the rollers 28 include a threaded hollow shaft 30. Although preferably the hollow shaft 30 is threaded into the release bearing 16, it is within the contemplation of this invention to support the rollers 28 by any means known by one knowledgeable in the art. Lubricant from the internal cavity 32 is communicates through the hollow shaft 30 to the rollers 28. This provides for the concurrent lubrication of the clutch release bearing and the rollers 28 thereby eliminating the need to independently lubricate the rollers 28. The rollers 28 supported about the shaft 28 may be of any type known in the art including needle bearings, roller bearings or the like.

Referring to FIGS. 6 and 6A, another embodiment of the clutch release bearing 16 is shown and includes a permanently lubricated roller 50. Permanently lubricated refers to rollers that include self-lubricating materials such as Teflon® and various known polymers, or to sealed rollers where lubricant is sealed within the bearing. It is within the scope of this invention to use any type of roller not requiring periodic lubrication as is known to one skilled in the art. In this embodiment, the shaft 52 includes threads 54 that engage mating threads 56 found in the clutch release bearing housing 21. It should be understood that it is within the scope of this invention to use any type of roller known to one skilled in the art, including permanently lubricated rollers and rollers that require lubrication.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A clutch assembly for a motor vehicle comprising:
   a shaft;
   a clutch release bearing, movable axially along said shaft, said clutch release bearing including first and second rollers, and an inner cavity in fluid communication with a lubrication fitting for lubricating said clutch release bearing;
   a clutch release fork in contact with said rollers of said clutch release bearing, to move said clutch release bearing along said shaft; and
   a hollow shaft, attached to said clutch release bearing and extending into said inner cavity, for supporting said rollers, and such that lubricant within said inner cavity is communicated to said rollers.

2. The assembly of claim 1, further including a sleeve, rotatable with said shaft and axially movable along said shaft, said sleeve being attached to said clutch release bearing such that said sleeve moves axially in response to axial movement of said clutch release bearing.

3. The assembly of claim 2, wherein said clutch release bearing further includes a bearing disposed between inner and outer bearing races disposed within a clutch release bearing housing.

4. The assembly of claim 3, wherein said inner race is attached to rotate with said sleeve and said shaft, and said outer race remains stationary relative to said sleeve and shaft such that axial movement of said clutch release bearing is transmitted through said bearing to said sleeve.

5. The assembly of claim 1, wherein said rollers are further supported by a threaded shaft engaged to mating threads of said clutch release bearing, such that said rollers are removable.

6. The assembly of claim 1, further including a pivotal connection between said release fork and a housing such that pivotal movement of said fork axially moves said clutch release bearing to actuate said clutch assembly.

7. The assembly of claim 1, wherein said fork includes an actuator arm and engagement arms, said actuator arm contacting an actuator selectively actuated to pivot said release fork and thereby move said clutch release bearing axially along said shaft.

8. A clutch assembly for a motor vehicle clutch comprising:
   a shaft supported for rotation about an axis;

a sleeve rotatable with and axially movable along said shaft;

a clutch release bearing attached to said sleeve, to move said sleeve along said axis, and including first and second rollers, said clutch release bearing further including a cavity filled with a lubricant, and said first and second rollers include a hollow shaft in fluid communication with said cavity, such that said lubricant from said cavity is communicated through said hollow shaft to said rollers; and a clutch release fork in contact with said rollers of said clutch release bearing to move said clutch release bearing axially along said shaft.

9. The assembly of claim 8, wherein said hollow shaft includes threads engaged to mating threads of said clutch release bearing such that said rollers are removable.

10. The assembly of claim 8, further including a pivotal connection between said release fork and a housing such that pivotal movement of said fork axially moves said clutch release bearing to actuate said clutch assembly.

11. The assembly of claim 8, wherein said fork includes an actuation arm and engagement arms, said actuation arm contacting an actuator selectively actuated to pivot said release fork and thereby move said clutch release bearing and said sleeve axially along said shaft.

12. The assembly of claim 8, wherein said clutch release bearing includes a bearing disposed between inner and outer bearing races within a clutch release bearing housing.

13. The assembly of claim 12, wherein said inner race is attached to rotate with said sleeve and said shaft, and said outer race remains stationary relative to said sleeve and shaft such that axial movement of said clutch release bearing is transmitted through said bearing to said sleeve.

* * * * *